United States Patent [19]
Jackson

[11] Patent Number: 4,968,902
[45] Date of Patent: Nov. 6, 1990

[54] UNSTABLE DATA RECOGNITION CIRCUIT FOR DUAL THRESHOLD SYNCHRONOUS DATA

[75] Inventor: Ronald M. Jackson, Portland, Oreg.

[73] Assignee: Tektronix, Inc., Beaverton, Oreg.

[21] Appl. No.: 388,453

[22] Filed: Aug. 2, 1989

[51] Int. Cl.$^5$ .................... H03K 5/153; H03K 5/22
[52] U.S. Cl. .................... 307/360; 307/354; 307/443; 328/117
[58] Field of Search .................... 307/354, 360, 443; 328/114, 117, 146, 164, 147, 148

[56] References Cited
U.S. PATENT DOCUMENTS

| | | | |
|---|---|---|---|
| 3,683,284 | 8/1972 | Mueller | 307/360 |
| 3,721,959 | 3/1973 | George | 307/360 |
| 3,806,915 | 4/1974 | Higgins et al. | 307/360 |
| 3,813,665 | 5/1974 | Parfomak et al. | 307/360 |
| 4,011,507 | 3/1977 | Rossell | 307/360 |
| 4,217,506 | 8/1980 | Sawyer, Jr. et al. | 307/360 |

*Primary Examiner*—John Zazworsky
*Attorney, Agent, or Firm*—Boulden G. Griffith

[57] ABSTRACT

A circuit allows digital data acquisition instruments to recognize when dual threshold synchronous data being monitored in unstable. Each data line being monitored for unstable periods is compared with a high threshold level and a low threshold level at an acquisition probe and the results of these two comparisons are forwarded to the circuit of the present invention. Optionally, a glitch latch may be employed to cause transient crossings of the threshold to be treated as if they lasted until the next clock. The two bits of resulting information are each clocked through a short shift register consisting of two flip-flops. A gate monitoring each of these short shift registers produces an active output when the state of the two flip-flops indicates that the signal left the high state or left the low state. A third gate monitors the last flip-flop in each short register to produce an active output when the signal is neither high nor low. The outputs of these three gates are summarized by a fourth gate to provide a local unstable signal for that single data line. The results across all of the lines being monitored are ORed into an unstable signal indicating the status of all of the lines being monitored. Individual enable signals determine which lines are to be monitored for instability at any one time. A counter/timer may be used to monitor the unstable signal for setup and hold time violations with respect to a clock signal.

12 Claims, 3 Drawing Sheets

UNSTABLE DATA RECOGNITION CIRCUIT FOR DUAL THRESHOLD SYNCHRONOUS DATA

BACKGROUND OF THE INVENTION

This invention relates to the field of digital data acquisition, and more particularly to the field of the identification of unstable intervals in dual threshold synchronous data.

For each family of digital logic devices, there is a voltage level above which the signal is unambiguously high and another voltage level below which the signal is unambiguously low, but there is also a zone in-between these two voltage levels that is neither unambiguously high nor unambiguously low. Normally, the voltage level of the signal only passes through this in-between region during logical transitions from high to low or low to high, although glitches or severe noise on the signal may result in unintended excursions into this region. Data whose voltage level is within this in-between region may be considered to be "unstable", since it is neither high nor low and is likely to be making a transition between these two logic states. Conversely, data which is one of the well defined states of high or low may be considered to be "stable".

Setup and hold time specifications inform the designer considering a particular logic device how much time, relative to the time of occurrence of a clock signal active edge, the device needs to have the signal at its input in a stable condition before and after the active clock edge. Setup time is the minimum time that an input signal must be stable prior to the active clock edge, while hold time is the minimum time that the signal must remain stable after the active clock edge. If either of these conditions are violated, the device is not guaranteed to perform its function properly.

A variety of modern digital instruments acquire data from synchronous systems and therefore would be improved by having a way of knowing when setup and hold requirements are violated. These include such instruments as logic analyzers, microprocessor analyzers, emulators, and integrated circuit testers. One prior art logic analyzer, the DAS 9200 Digital Analysis System from Tektronix, Inc., is known to include a module, the 92A16 Data Acquisition Module, that permits setup and hold violation monitoring. This module does not, however, actually measure when the data is between logic levels, but rather relies on glitch detection and high speed asynchronous monitoring of the data to detect transitions. As shown in FIG. 1, detected edges and glitches are ORed to create a bit-unstable signal for each channel. These are then ORed across all of the channels of interest to a bus-unstable signal. The setup and hold times are then measured with respect to this unstable signal.

Recognition of unstable asynchronous data is not new. FIG. 2 shows a prior art circuit suitable for recognizing when asynchronous data is unstable. Two voltage comparators compare the level of a single digital data signal to a high threshold and a low threshold. An AND gate connected to the outputs of the two comparators detects when the signal is above the low threshold and below the high threshold, generating an in-between signal when this occurs. The in-between signals for a set of related signals are ORed to produce an unstable signal that indicates when any of the signals in the set are in-between.

However, when acquisition probes are employed which synchronize the incoming data from dual thresholds to the system clock in the probe, and this synchronized data is then transmitted through a cable to the actual acquisition instrument, the circuitry in that instrument must be able to recognize the occurrence of unstable data in this dual threshold synchronous data. What is desired is a circuit that allows digital data acquisition instruments to recognize when dual threshold synchronous data being monitored is unstable.

SUMMARY OF THE INVENTION

The present invention is a circuit that allows digital data acquisition instruments to recognize when dual threshold synchronous data being monitored is unstable. Each data line being monitored for unstable periods is compared with a high threshold level and a low threshold level at an acquisition probe and the results of these two comparisons are forwarded to the circuit of the present invention. Optionally, a glitch latch may be employed to cause transient crossings of the threshold to be treated as if they lasted until the next clock. The two bits of resulting information are each clocked through a short shift register consisting of two flip-flops. A gate monitoring each of these short shift registers produces an active output when the state of the two flip-flops indicates that the signal left the high state or left the low state. A third gate monitors the last flip-flop in each short shift register to produce an active output when the signal is neither high nor low. The outputs of these three gates are summarized by a fourth gate to provide a local unstable signal for that single data line. The results across all of the lines being monitored are ORed into an unstable signal indicating the status of all of the lines being monitored. Individual enable signals determine which lines are to be monitored for instability at any one time.

DETAILED DESCRIPTION

Figure 1:
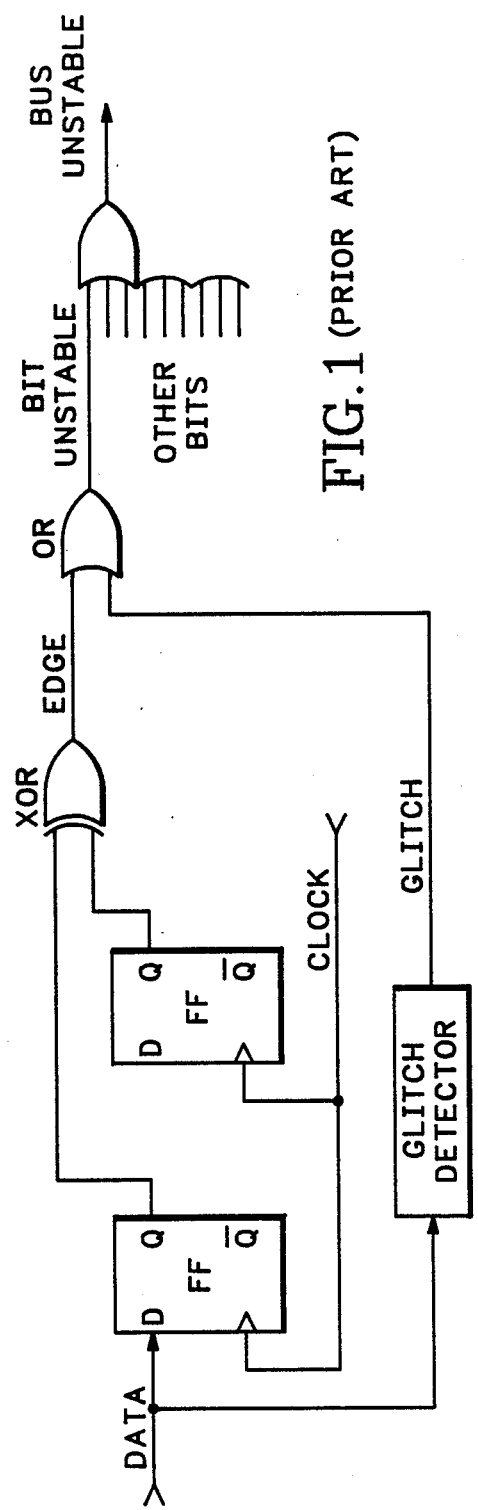
FIG. 1 is a schematic diagram of a prior art unstable data recognizer for single threshold synchronous data.
Figure 2:
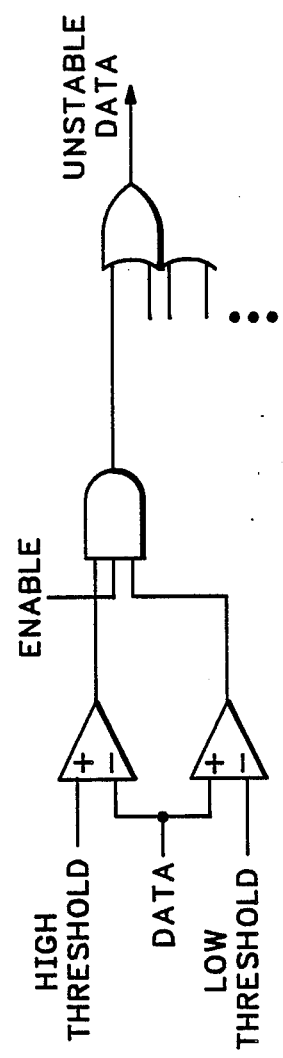
FIG. 2 is a schematic diagram of a prior art asynchronous version of an unstable data recognizer.
Figure 3:
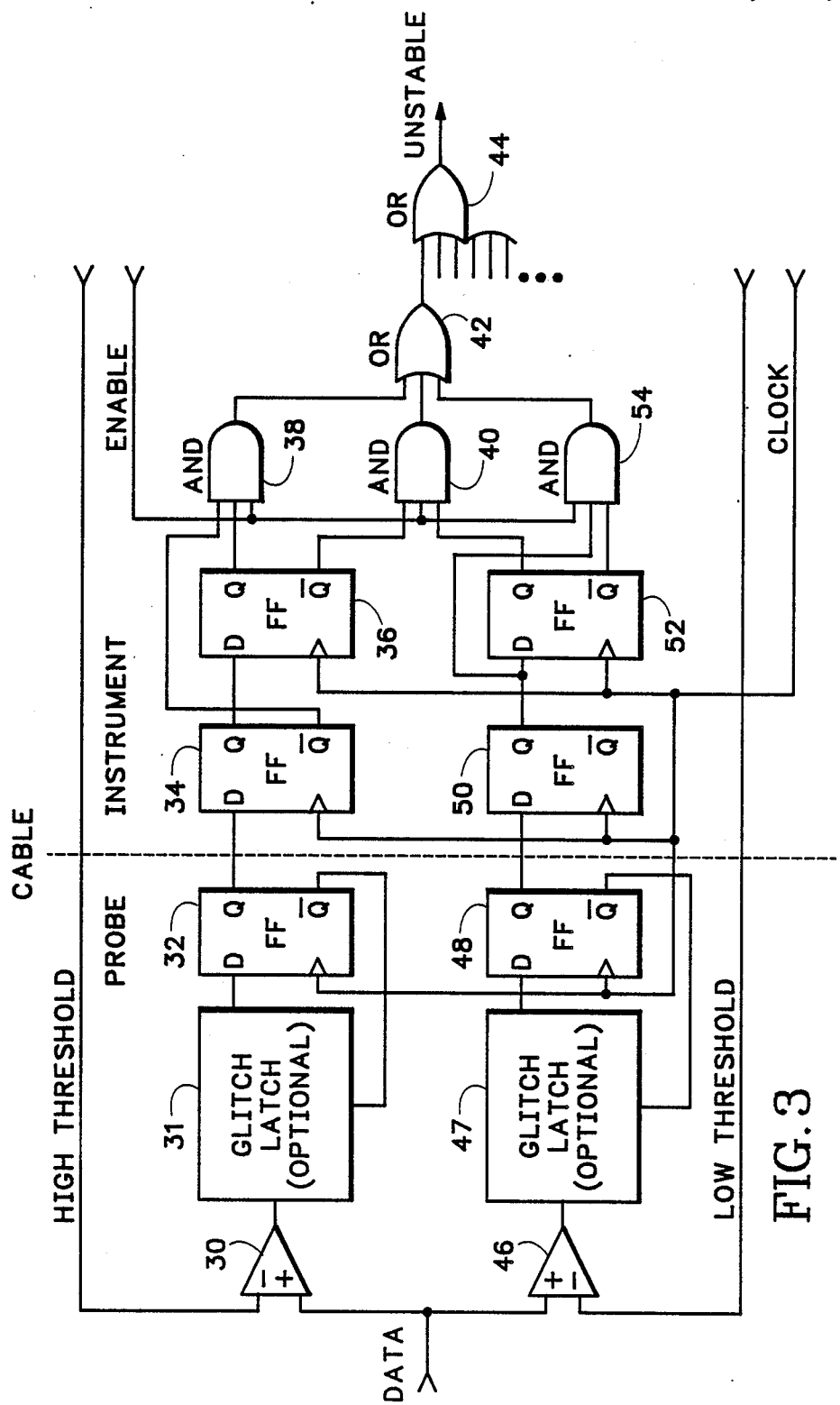
FIG. 3 is a schematic diagram of the invention, a synchronous version of an unstable data recognizer for dual threshold data.

FIG. 3 is a schematic diagram of a representative portion of an unstable data recognizer suitable for use with synchronous dual threshold data. Note the vertical dotted line in FIG. 3 labeled "CABLE". The circuitry to the left of this line may be physically located in an acquisition probe. The circuitry to the right of this line may be in the acquisition instrument itself. The dotted line itself then represents a cable connecting the probe to the instrument.

A signal representing one bit of digital data is applied to the plus inputs of the high side voltage comparator 30 and the low side voltage comparator 46. A high threshold voltage level is applied to the minus input of high side voltage comparator 30, while a low threshold voltage level is applied to the minus input of the low side voltage comparator 46. Thus, the high side voltage comparator 30 outputs a high level when the data signal level is above the high threshold voltage level and the low side voltage comparator outputs a high level when the data signal level is above the low threshold voltage level.

The outputs of the high and low side voltage comparators 30 and 46 are applied to the inputs of glitch latches 31 and 47. These latch transient crossings of their respective thresholds until the occurrence of the next clock signal, when the resulting data is clocked into the first high and low side flip-flops 32 and 48. These glitch latches 31 and 47 are optional. If the positive outputs of the comparators 30 and 46 are connected directly to the D inputs of the first high and low side flip-flops 32 and 48, only the state of the comparators at the time of the active clock edge is stored in the flip-flops and transients occurring between clock pulse active edges are ignored.

The first high side flip-flop 32 monitors the output of the high side voltage comparator 30 or the (optional) high side glitch latch 31 and stores its status on the occurrence of every active edge of the acquiring instruments clock signal. A "1" stored in the first high side flip-flop 32 indicates that, at the time of the last active clock edge, the data signal voltage level was above the high threshold voltage level or, optionally, that the data signal was above the high threshold voltage level at some time since the last clock. The first low side flip-flop 48 monitors the output of the low side voltage comparator 46 or the optional low side glitch latch 47 and stores its status on the occurrence of every active edge of the clock signal. A "1" stored in the first low side flip-flop 48 indicates that, at the time of the last active clock edge, the data signal voltage level was above the low threshold voltage level or, optionally, that that the data signal was above the low threshold voltage level at some time since the last clock.

The second high side flip-flop 34 and the second low side flip-flop 50 provide protection against the possibility of metastability in the outputs of the first high side and first low side flip-flops 32 and 48. This is necessary because transitions in the state of the data in the system under test is asynchronous with the clock signal in the acquiring instrument. The third high and low side flip-flops 36 and 52, in conjunction with the second high and low side flip-flops 34 and 50, create a pair of very short shift registers, thereby permitting the high side and low side AND gates 38 and 54 to make comparisons between the current and previous states of the high and low side information about the data signal.

High side AND gate 38 has the Q-not output of the second high side flip-flop 34 as one of its inputs, and the Q output of the third high side flip-flop 36 as another input. A third enable input selects this channel for monitoring. When it is enabled, the AND gate 38 produces a "1" output when the third high side flip-flop 36 contains a "1" at the same time that the second high side flip-flop 34 contains a "0". This combination only occurs when the data signal has been high on one clock active edge and then is not high on the next clock active edge, i.e., a transition out of the high state.

Similarly, low side AND gate 54 has the Q-not output of the third low side flip-flop 52 as one of its inputs, and the Q output of the second low side flip-flop 50 as another input. A third enable input selects this channel for monitoring. When enabled, the AND gate 54 produces a "1" output when the third low side flip-flop 52 contains a "0" at the same time that the second low side flip-flop 50 contains a "1". This combination only occurs when the data signal has been low on one clock active edge and then is not low on the next clock active edge, i.e., a transition out of the low state.

It should be noted that the basic scheme just described will work with other equivalent logical implementations. For instance, if the connections on the inputs of the low side voltage comparator 46 are reversed, so that it outputs a "1" when the data signal is below the low threshold, the low side AND gate 54 would have to look at the opposite outputs from the second and third low side flip-flops 50 and 52 in order to achieve the same effect, i.e., output a "1" on the occurrence of transitions out of the low state.

In-between AND gate 40 receives one of its inputs from the Q-not output of the third high side flip-flop 36 and the other one of its inputs from the Q output of the third low side flip-flop 52. Thus, this AND gate 40 will be satisfied when the content of the third high side flip-flop 36 is a "0" and the content of the third low side flip-flop 52 is a "1". Therefore, the in-between AND gate 40 detects when the contents of these flip-flops 36 and 52 indicate that the data signal was in-between the high and the low thresholds at the time that this sample was acquired. This connection scheme is believed to be preferable to the following alternative.

Alternatively, in-between AND gate 40 can receive one of its inputs from the Q-not output of the second high side flip-flop 34 and the other one of its inputs from the Q output of the second low side flip-flop 50. Thus, this AND gate 40 will be satisfied when the content of the second high side flip-flop 34 is a "0" and the content of the second low side flip-flop 50 is a "1". Therefore, the in-between AND gate 40 detects when the contents of these flip-flops 34 and 50 indicate that the data signal was in-between the high and the low thresholds at the time that this sample was acquired.

The outputs of all three AND gates 38, 40 and 54 are applied to the inputs of OR gate 42. OR gate 42 thus produces a high output whenever the outputs of any of the AND gates 38, 40, or 54 are high. This occurs when the level of the data signal is neither high nor low, i.e., in-between via AND gate 40, or, when there has just been a transition out of either logic state via AND gates 38 or 54.

All of the circuitry shown in FIG. 3, except summarizing OR gate 44, is used to evaluate one channel of data. Each additional bit of data to be evaluated requires another set of similar circuitry. OR gate 44 summarizes the results from a number of data signals, each analyzed as just described above, to produce an unstable signal when any of the data signals being monitored is in-between or transitioning out of one of the known logic states.

Figure 4:
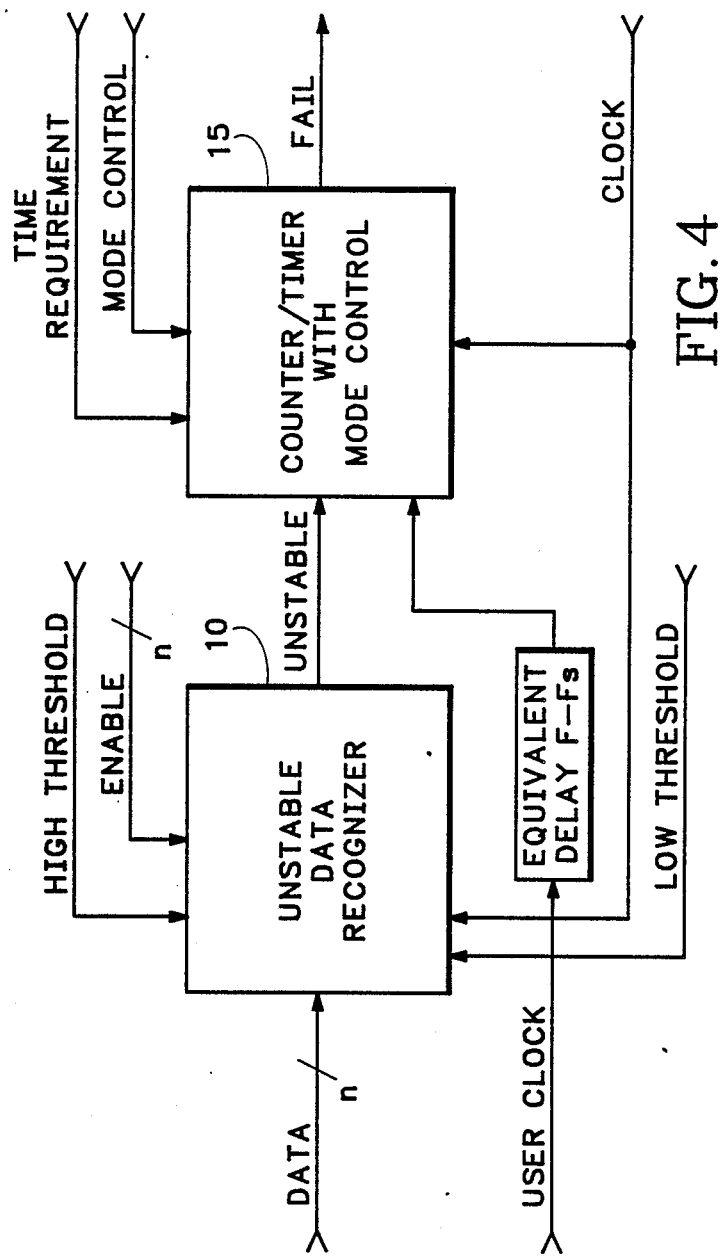
FIG. 4 is a block diagram of the invention being used in conjunction with a counter/timer to measure or monitor periods of data instability.

Referring to FIG. 4, an unstable data recognizer 10 and a counter/timer 15 with associated mode control circuitry are used to measure periods of stability and instability and to detect setup and hold time violations. The unstable data recognizer has a number (n) of data signal inputs, an equal number (n) of enable signals, a high threshold voltage level, a low threshold voltage level, and a clock signal. The output of the unstable data recognizer is an unstable data signal indicating when any of the enabled digital data signals are transitioning or are in-between their high and low threshold values.

The counter/timer 15 receives the unstable data signal from the unstable data recognizer 10, a user clock signal, a clock signal from the data acquisition instrument that is examining the data, a mode control signal or signals, and a line or lines conveying the time requirements. The user clock signal has been synchronized to the acquiring system clock signal and passed through a series of flip-flops equivalent to the data path through the unstable data recognizer 10. The time requirement can refer to setup time, hold time, stable time, or unstable time. If the counter/timer 15 can receive serial preloading count information and sufficient time is available for serial loading, the setup or hold time requirement can be supplied on one line serially. Otherwise, a number of lines are necessary to supply this information in parallel. The mode control signal can be a single line if only two modes of operation are contemplated, e.g., setup and hold. If additional modes of operation are desired, more mode control signal lines can be used. Other modes might be "data stable time" or "data unstable time". Obviously, if the circuit is dedicated to only one of these modes of operation, the mode control signal can be dispensed with entirely. The counter/timer 15 counts acquisition system clocks and thus has a timing resolution equal to the period of the acquisition system clock signal.

The output of the counter/timer 15 is a fail signal that is asserted under the following conditions which vary from mode to mode. The counter/timer 15 is configured so that it counts down from a pre-loaded value toward zero. In the setup time violation monitoring mode, the time requirement value is the minimum necessary setup time and the timer begins counting down from this value when the unstable signal goes from asserted to unasserted. If an active user clock edge is received by the counter/timer 15 before it has finished counting down, there was insufficient setup time and the fail signal output is asserted. If the timer finishes counting down before the active edge of the user clock signal, then the setup time requirement was met and the fail signal output is not asserted. The active user clock edge is also ignored if the counter has not yet been started by the unstable signal going from asserted to unasserted.

In the hold time mode, the timer portion of the counter/timer 15 is pre-loaded with the hold time requirement. In this mode, however, the active user clock edge starts the timer counting and the fail signal output is asserted only if the unstable signal from the unstable data recognizer 10 goes active before the timer has finished its countdown. If the timer has reached zero, or has not been started, when the unstable signal goes active, no fail output is generated.

The counter/timer circuit 15 can also be configured to check for sufficient periods of data stability. The timer portion can be pre-loaded with the value of the minimum acceptable period of data stability, the countdown started by the unstable signal going unasserted, and a fail signal output is then generated if the unstable signal goes asserted before the timer has timed out. Similarly, to monitor periods of instability, the maximum acceptable period of data instability is pre-loaded as the time requirement, the count is started when the unstable signal goes active, and a fail signal output is generated if the timer reaches zero before the unstable signal goes unasserted. If measuring these quantities, rather than monitoring them, is desired, it can be accomplished with appropriate mode control circuitry and additional lines for count/time readback.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true spirit and scope of the invention.

I claim:

1. A circuit for recognizing when a digital data signal is unstable from information contained in two synchronous signals, referenced-to-high and referenced-to-low, representing the relationship of the digital data signal to a high threshold and a low threshold, the circuit comprising:

first means for determining when the synchronized referenced-to-high signal indicates that the digital data signal has gone from above the high threshold to below the high threshold to produce a transition-out-of-high signal;

second means for determining when the synchronized referenced-to-low signal indicates that the digital data signal has gone from below the low threshold to above the low threshold to produce a transition-out-of-low signal;

third means for determining when the synchronized referenced-to-high signal indicates that the digital data signal is below the high threshold at the same time that the synchronized referenced-to-low signal indicates that the digital data signal is above the low threshold to produce an in-between signal; and bit summarizing means for producing an unstable-bit signal whenever the transition-out-of-high signal, the transition-out-of-low signal, or the in-between signal is active.

2. A circuit as recited in claim 1 further comprising:
   an additional set of the elements of claim 1; and
   summarizing means for producing an unstable signal in response to the active unstable-bit signal from any bit summarizing means.

3. A circuit as recited in claim 1 wherein the first means for determining comprises:
   a next state high side flip-flop clocked by a clock signal for receiving the synchronized referenced-to-high signal;
   a current state high side flip-flop clocked by the clock signal for receiving the synchronized referenced-to-high signal from the next state high side flip-flop; and
   transition-out-of-high gating means for comparing the contents of the next state high side flip-flop and the current state high side flip-flop to produce a transition-out-of-high signal when the content of current state high side flip-flop indicates that the digital data signal was above the high threshold and the contents of the next state high side flip-flop indicates that the digital data signal was below the high threshold.

4. A circuit as recited in claim 1 wherein the second means for determining comprises:
   a next state low side flip-flop clocked by a clock signal for receiving the synchronized reference-to-low signal;
   a current state low side flip-flop clocked by the clock signal for receiving the synchronized referenced-to-low signal from the next state low side flip-flop; and
   transition-out-of-low gating means for comparing the contents of the next state low side flip-flop and the current state low side flip-flop to produce a transition-out-of-low signal when the contents of current state low side flip-flop indicate that the digital data signal was below the low threshold and the contents of the next state low side flip-flop indicate that the digital data signal was above the low threshold.

5. A circuit as recited in claim 4 wherein the first means for determining comprises:
   a next state high side flip-flop clocked by the clock signal for receiving the synchronized referenced-to-high signal from the synchronizing means;
   a current state high side flip-flop clocked by the clock signal for receiving the synchronized referenced-to-high signal from the next state high side flip-flop; and
   transition-out-of-high gating means for comparing the contents of the next state high side flip-flop and the current state high side flip-flop to produce a transition-out-of-high signal when the contents of current state high side flip-flop indicates that the digital data signal was above the high threshold and the contents of the next state high side flip-flop indicate that the digital data signal was below the high threshold.

6. A circuit as recited in claim 5 wherein the third means for determining comprises:
   gating means for monitoring the current state high side flip-flop and the current state low side flip-flop to produce an in-between signal when the referenced-to-high signal stored in the current state high side flip-flop indicates that digital data signal was below the high threshold at the same time that the referenced-to-low signal stored in the current state low side flip-flop indicates that the digital data signal was above the low threshold.

7. A circuit as recited in claim 1 further comprising a counter/timer disposed to monitor the unstable signal.

8. A circuit as recited in claim 2 further comprising a counter/timer disposed to monitor the unstable signal.

9. A circuit as recited in claim 1 further comprising means for comparing the digital data signal to the high threshold and the low threshold to produce the two synchronous signals, referenced-to-high and referenced-to-low.

10. A circuit as recited in claim 2 further comprising means for comparing the digital data signal to the high threshold and the low threshold to produce the two synchronous signals, referenced-to-high and referenced-to-low.

11. A circuit as recited in claim 9 further comprising means for detecting and latching glitches until the next clock pulse, said means disposed between the comparing means and the first and second determining means.

12. A circuit as recited in claim 10 further comprising means for detecting and latching glitches until the next clock pulse, said means disposed between the comparing means and the first and second determining means.

* * * * *